US012778347B2

(12) United States Patent
Zhao et al.

(10) Patent No.: US 12,778,347 B2
(45) Date of Patent: Nov. 3, 2026

(54) GRINDING DEVICE AND GRINDING APPARATUS

(71) Applicant: GUANGDONG MIDEA CONSUMER ELECTRIC MANUFACTURING CO., LTD., Foshan (CN)

(72) Inventors: Jinzhang Zhao, Foshan (CN); Lixin Liu, Foshan (CN); Zhengjun Zhou, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 267 days.

(21) Appl. No.: 18/793,010

(22) Filed: Aug. 2, 2024

(65) Prior Publication Data

US 2025/0040762 A1 Feb. 6, 2025

(30) Foreign Application Priority Data

Aug. 4, 2023 (CN) ........................ 202322088016.X

(51) Int. Cl.
*A47J 42/46* (2006.01)

(52) U.S. Cl.
CPC .................................... *A47J 42/46* (2013.01)

(58) Field of Classification Search
CPC .. A47J 42/46; A47J 42/16; A47J 42/06; A47J 43/046; A47J 43/08; A47J 43/085
See application file for complete search history.

(56) References Cited

U.S. PATENT DOCUMENTS

| | | | |
|---|---|---|---|
| 10,791,875 | B2 | 10/2020 | Guo et al. |
| 2018/0325320 | A1 | 11/2018 | Guo et al. |

FOREIGN PATENT DOCUMENTS

| | | | | | |
|---|---|---|---|---|---|
| CN | 212878946 | U * | 4/2021 | | |
| EP | 2524636 | A1 * | 11/2012 | ............. | A47J 42/06 |
| WO | WO-2017045449 | A1 * | 3/2017 | ............. | A47J 31/42 |

(Continued)

OTHER PUBLICATIONS

Translation of WO-2024201131.*

(Continued)

*Primary Examiner* — Bobby Yeonjin Kim
(74) *Attorney, Agent, or Firm* — Anova Law Group, PLLC

(57) ABSTRACT

A grinding device includes a grinding assembly, a power output assembly, and a manipulation assembly. The grinding assembly includes a mounting member, a first grinding member, and a second grinding member cooperating with the first grinding member to implement grinding. The power output assembly includes a power element and a planetary gear mechanism. The planetary gear mechanism includes a sun gear, a planet gear, an internal gear ring, and a fixation frame. The sun gear is connected to the power element in a force-transfer manner. The planet gear is rotatably mounted at the fixation frame. The fixation frame includes an output member configured to output power. The manipulation assembly is connected to the mounting member. One of the first and second grinding members is connected to the output member in a force-transfer manner. Another one of the first and second grinding members is mounted at the manipulation assembly.

19 Claims, 9 Drawing Sheets

(56) References Cited

FOREIGN PATENT DOCUMENTS

| | | | | | |
|---|---|---|---|---|---|
| WO | 2023019900 | A1 | | 2/2023 | |
| WO | WO-2024201131 | A1 | * | 10/2024 | ............ A47J 43/085 |

OTHER PUBLICATIONS

Translation of CN-212878946.*
Translation of WO-2017045449.*
Translation of EP-2524636.*
The European Patent Office (EPO) The Intention to grant for EP Application No. 24174476.2, Sep. 18, 2025 40 Pages.
Korean Intellectual Property Office (KIPO) The Request for the Submission of an Opinion for KR Application No. 10-2024-0068504 Jan. 13, 2026 13 Pages (Translation Included ).
The European Patent Office (EPO) Extended Search Report for EP Application No. 24174476.2, Sep. 26, 2024 8 Pages.

* cited by examiner

B-B

GRINDING DEVICE AND GRINDING APPARATUS

CROSS-REFERENCE TO RELATED APPLICATION

This application claims priority to Chinese Application No. 202322088016.X, filed on Aug. 4, 2023, the entire content of which is incorporated herein by reference.

FIELD

The present disclosure relates to the field of grinding device technologies, and more particularly, to a grinding device and a grinding apparatus.

BACKGROUND

Common ingredient grinding apparatuses include coffee grinder, bean grinder, and pulverizing mill, which grind bean ingredients (granular ingredients such as coffee beans, soybeans, peanuts, peppercorns, etc.) into powder of suitable coarseness and fineness through a grinding device. A grinding device mostly operates with a drive motor in conjunction with a transmission mechanism and a grinding assembly.

For some grinding apparatuses, such as the coffee grinder, the grinding device is only a functional device in the grinding apparatus, and is mounted at a device host, where a volume of the grinding device has a direct impact on a volume of the apparatus. Therefore, how to reduce the volume of the grinding device has become a hotspot in the research and development of the grinding device.

SUMMARY

To solve a problem that a current grinding device is large in volume, the present disclosure provides a grinding device and a grinding apparatus.

According to one embodiment of the present disclosure, the grinding device is provided. The grinding device includes: a grinding assembly including a first mounting member, a first grinding member, and a second grinding member cooperating with the first grinding member to implement grinding; a power output assembly including a power element and a planetary gear mechanism, the planetary gear mechanism including a sun gear, a planet gear, an internal gear ring, and a fixation frame, the sun gear being connected to the power element in a force-transfer manner, the planet gear being rotatably mounted at the fixation frame, and the fixation frame having an output member configured to output power; a manipulation assembly connected to the first mounting member. One of the first grinding member and the second grinding member is connected to the output member in a force-transfer manner, and another one of the first grinding member and the second grinding member is mounted at the manipulation assembly.

As can be seen from the above technical solution, the present disclosure provides the grinding device including the power output assembly, the grinding assembly, the manipulation assembly, and the support assembly. The power output assembly is configured to drive the first grinding member and the second grinding member in the grinding assembly to rotate with respect to each other, thereby grinding bean ingredients. The power output assembly includes the power element and the planetary gear mechanism. The planetary gear mechanism has a large reduction ratio, occupies little space, and has stable power output, which can reduce noises of the grinding device. Power output from the power element is input by the sun gear of the planetary gear mechanism, and is output, after being decelerated from the sun gear to the planet gear to the internal gear ring in the planetary gear mechanism, by the output member of the fixation frame to the grinding assembly. By arranging the fixation frame, on the one hand, the fixation frame is configured to mount the planet gear to realize a function of a planetary frame, and on the other hand, a torque can be directly output to the grinding assembly, i.e., in the grinding device provided in the present disclosure, the planetary frame and a torque output component are integrated into the fixation frame. Therefore, compared to a transmission method in the related art in which the planet gear engages with an external gear ring to output torque, one component is saved, and a simpler structure and a more compact internal space of the planetary gear mechanism enable the volume of the grinding device to be reduced.

In some embodiments, the first mounting member is a hollow lower housing. The fixation frame is located in a cavity of the lower housing, and is rotatably connected to the first mounting member through a bearing.

Since the first mounting member serves as a mounting base for other components in the grinding assembly and the manipulation assembly, the fixation frame is rotatably connected to the first mounting member through the bearing, which enables the fixation frame to be centered by the first mounting member and the bearing to reduce an eccentricity of the fixation frame relative to the first grinding member or the second grinding member.

In some embodiments, the grinding assembly further includes a powder thrower connected to the output member in a force-transfer manner, the powder thrower being arranged below the first grinding member and the second grinding member, and the powder thrower, the first grinding member, and the second grinding member being located in the cavity of the lower housing.

By arranging the powder thrower, centrifugal force generated by rotation is utilized to throw out the powder obtained by grinding to an inner cavity wall of the lower housing, facilitating the discharge of the powder. The first grinding member or the second grinding member and the powder thrower are connected to the output member in a force-transfer manner. The first grinding member or the second grinding member, the powder thrower, and the output member may only rotate without being axially displaced, eliminating an axial relative displacement of the planetary gear mechanism and the grinding assembly, and reducing noise.

In some embodiments, the first grinding member is connected to the output member in a force-transfer manner, and the powder thrower has a positioning cavity. The output member protrudes outwardly and extends into the positioning cavity.

The first grinding member has a limit cavity, and the powder thrower is provided with a limit member protruding outwardly. The limit member extends into the limit cavity.

By arranging the positioning cavity, the limit cavity, and the limit member, a positioning assembling between the first grinding member, the powder thrower, and the output member is facilitated, and axial and circumferential limitations are provided.

In some embodiments, the grinding assembly further includes a powder blocking cover connected to the lower housing in a snapping manner. The powder blocking cover is arranged in the cavity of the lower housing and is located above the powder thrower.

By arranging the powder blocking cover, the powder obtained by grinding falls on the powder thrower and is thrown outward by an action of the powder thrower.

In some embodiments, the manipulation assembly includes a second mounting member and an adjustment member rotatably connected to each other. The second mounting member is at least partially movably nested with the first mounting member, and the first mounting member is threadedly connected to the adjustment member.

By arranging that the first mounting member is at least partially movably nested with the second mounting member, an axial size of the grinding device can be significantly reduced. By arranging that the first mounting member is connected to the second mounting member through the adjustment member, since the first mounting member, the support assembly, and the planetary gear mechanism are connected, no displacement occurs in an axial direction. Therefore, when the adjustment member is rotated, the adjustment member drives the second mounting member to move in the axial direction together, enabling that the first grinding member and the second grinding member that are respectively connected to the planetary gear mechanism and the second mounting member generate an axial relative movement. An axial gap between the first grinding member and the second grinding member can be adjusted to change a particle volume of grinding powder. On the other hand, since the first mounting member is connected to the second mounting member through the adjustment member in a threaded manner, only axial controlled displacement may occur between the first mounting member and the second mounting member, and active axial movement and active radial displacement will not occur during operation, which can ensure a grinding gap required by the first grinding member and the second grinding member and can avoid a collision and heating of the first grinding member and the second grinding member, solving problems of loud noise and grinding powder burning.

In some embodiments, the first mounting member is provided with a plurality of threaded protrusions arranged at intervals in a circumferential direction. The plurality of threaded protrusions are threadedly connected to the adjustment member.

By arranging threads of the first mounting member as thread segments arranged at intervals in the circumferential direction, a threaded connection between the first mounting member and the adjustment member is not affected. Since the plurality of threaded protrusions are arranged at intervals, the first mounting member can still be effectively connected to the adjustment member under a condition that certain deformation occurs due to heat.

In some embodiments, the second mounting member is a hollow upper housing, and the upper housing is provided with a second snap member. The upper housing is rotatably connected to the adjustment member through the second snap member.

By arranging the upper housing to be rotatably connected to the adjustment member, when the adjustment member is rotated, the upper housing only moves in the axial direction along with the adjustment member without rotating.

In some embodiments, the upper housing is movably arranged around the first mounting member. The first mounting member is provided with a powder outlet, and the upper housing is provided with a penetration hole opposite to the powder outlet.

In some embodiments, the planet gear includes a primary gear and a secondary gear that are arranged coaxially. The primary gear is engaged with the sun gear, and the secondary gear is engaged with the internal gear ring. The primary gear is closer to the output member than the secondary gear.

By arranging the planet gear to include the primary gear and the secondary gear, forming a following power transmission path: the power element to the sun gear to the primary gear to the secondary gear to the fixation frame to the output member to the first grinding member/the second grinding member. Since the primary gear is closer to the first grinding member and the second grinding member than the secondary gear, the power transmission is not transmitted along a straight line, and there is a reciprocating transmission process in an axial direction of the planet gear. It is possible to improve transmission stability of the planetary gear mechanism and significantly reduce an eccentricity of the fixation frame relative to the first grinding member/the second grinding member.

In some embodiments, the planetary gear mechanism further includes a planet gear shaft. The planet gear has a through-hole extending in the axial direction. The planet gear shaft rotatably extends into the through-hole and is fixedly connected to the fixation frame.

By arranging the planet gear to rotate around the planet gear shaft, each of two ends of the planet gear shaft is connected to the fixation frame, which conducts a rotation from the planet gear to the fixation frame.

In some embodiments, the planetary gear mechanism further includes a bottom housing. The bottom housing is fixedly connected to a casing of the power element and is connected to the first mounting member. The internal gear ring of the planetary gear mechanism and the bottom housing are integrally formed.

By arranging the bottom housing, the planetary gear mechanism is mounted at the first mounting member, and the internal gear ring is integrally formed on the bottom housing, enabling that the planetary gear mechanism has a more compact structure and a smaller volume.

In some embodiment, the grinding device further includes a support assembly removably connected to the first mounting member.

By arranging the support assembly to connect to the first mounting member, the grinding device as a whole is mounted at a host of the grinding apparatus.

In some embodiments, the support assembly includes a hollow support frame, a sleeve, and an elastic member sleeved on the sleeve. The support frame has a mounting hole configured to mount the sleeve and the elastic member.

By arranging an elastic member between the support frame and the sleeve, it enables that when the grinding device is mounted at the host of the grinding apparatus, a vibration transmission at a mounting position can be reduced, and operating noise of the apparatus can be reduced.

In some embodiments, the support assembly is a hollow structure, and has an inner surface provided with a plurality of rotation stop blocks arranged at intervals. The first mounting member has a first snap member. The first mounting member is snapped with the support assembly through the first snap member, and the first snap member is located between two adjacent rotation stop blocks.

By arranging that the first mounting member is snapped with the support assembly, which enables that the first mounting member is convenient to assemble and disassemble. The rotation stop block may prevent the first mounting member from rotating, which enables that reaction force is provided for the first mounting member when the adjustment member is rotated.

According to one embodiment of the present disclosure, the grinding apparatus is provided. The grinding apparatus includes the grinding device according to the above embodiment.

In some embodiments, the grinding apparatus includes a coffee grinder, a bean grinder, or a pulverizing mill.

BRIEF DESCRIPTION OF THE DRAWINGS

In order to clearly explain technical solutions of embodiments of the present disclosure, drawings used in the description of the embodiments or the related art are briefly described below. The drawings as described below are merely some embodiments of the present disclosure. Based on these drawings, other drawings can be obtained by those skilled in the art without creative effort.

Figure 1:
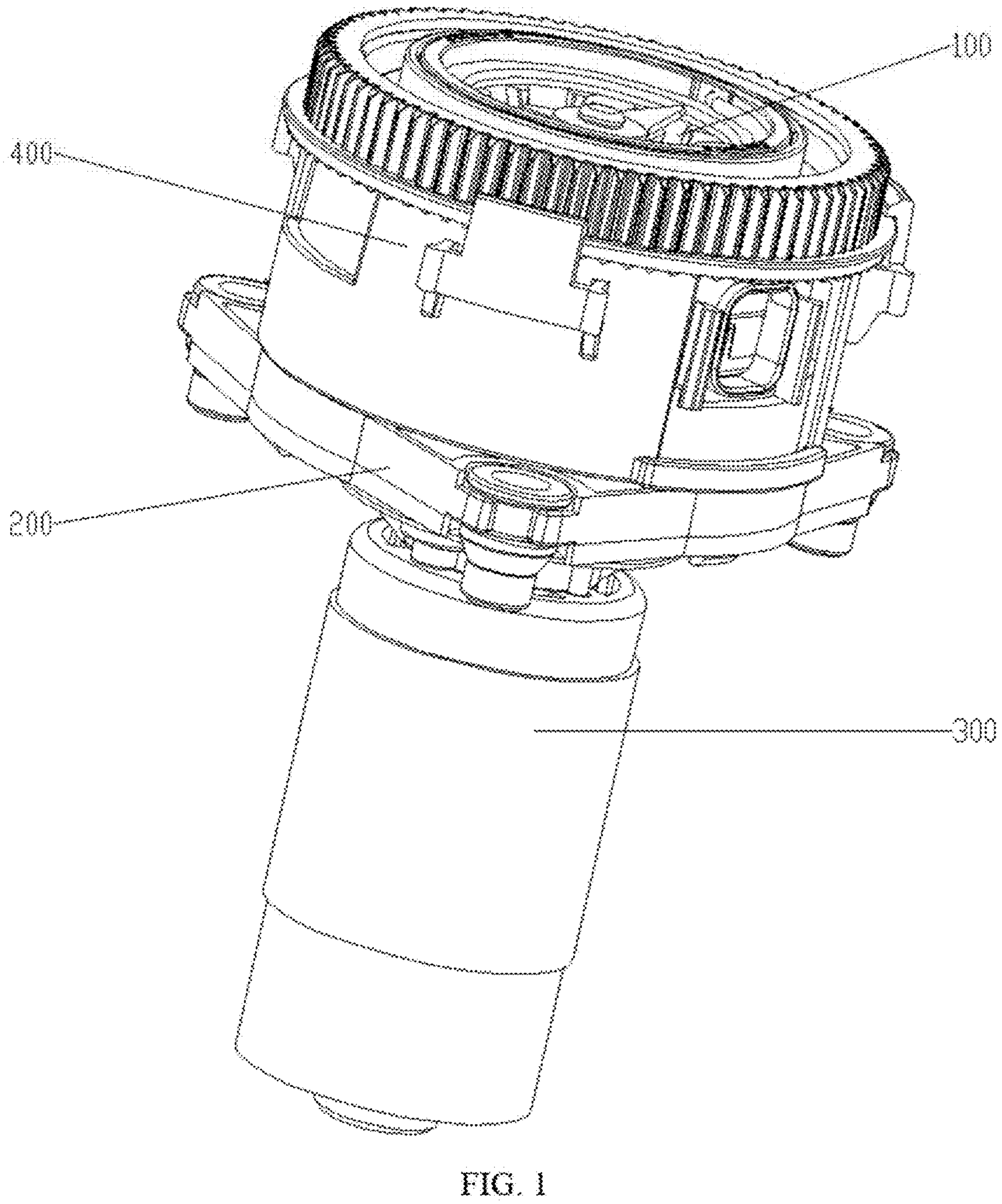
FIG. 1 shows a schematic view of a structure of a grinding device in an embodiment of the present disclosure.

Reference numerals of the accompanying drawings are explained as follows:

- 100, grinding assembly; 110, first mounting member; 111, powder outlet; 110*a*, lower housing; 111*a*, first snap member; 112*a*, threaded protrusion; 120, first grinding member; 121, limit cavity; 130, second grinding member; 140, powder thrower; 141, positioning cavity; 142, limit member; 150, first screw rod; 151, gasket; 160, powder blocking cover; 170, sealing ring; 180, fixation frame; 181, handle.
- 200, support assembly; 210, support frame; 211, rotation stop block; 212, mounting hole; 220, sleeve; 230, elastic member.
- 300, power output assembly; 310, power element; 310*a*, motor; 320, planetary gear mechanism; 321, fixation frame; 3211, main body; 3212, gear mounting cavity; 3213, pin hole; 3214, positioning member; 3215, output member; 322, sun gear; 323, planet gear; 3231, primary gear; 3232, secondary gear; 3233, through-hole; 324, planet gear shaft; 325, internal gear ring; 326, bottom housing; 327, third snap member; 330, bearing; 340, washer; 350, second screw rod.
- 400, manipulation assembly; 410, second mounting member; 410*a*, upper housing; 411*a*, second snap member; 412*a*, penetration hole; 420, adjustment member.

DETAILED DESCRIPTION OF THE EMBODIMENTS

Technical solutions of embodiments of the present disclosure will be clearly and completely described below in conjunction with accompanying drawings in the present disclosure. Obviously, the embodiments described below are only part of the embodiments of the present disclosure and are not all embodiments of the present disclosure. Based on the embodiments of the present disclosure, other embodiments obtained by those skilled in the art without creative labor are within scope of the present disclosure.

In addition, reference numerals and/or reference letters may be repeated in different examples of the present disclosure. Such repetition is for the purpose of simplicity and clarity and does not indicate any relationship between various embodiments and/or arrangements in question. In addition, various examples of specific processes and materials are provided in the present disclosure. However, those of ordinary skill in the art may be aware of applications of other processes and/or the use of other materials.

In the related art, the grinding device is a functional device arranged in a grinding apparatus, a volume of the grinding device directly affects a volume of the apparatus. An excessively large grinding device will cause the grinding apparatus to be too large. The embodiments of the present disclosure provide the grinding device and the grinding apparatus, which can at least solve a technical problem of large volume of a current grinding device to a certain extent. The present disclosure is described below with reference to specific embodiments in conjunction with the accompany drawings.

According to one embodiment of the present disclosure, the grinding device is provided. The grinding device has a smaller volume than the grinding device in the related art, which solves the technical problem of large volume of the current grinding device to a certain extent.

Figure 2:
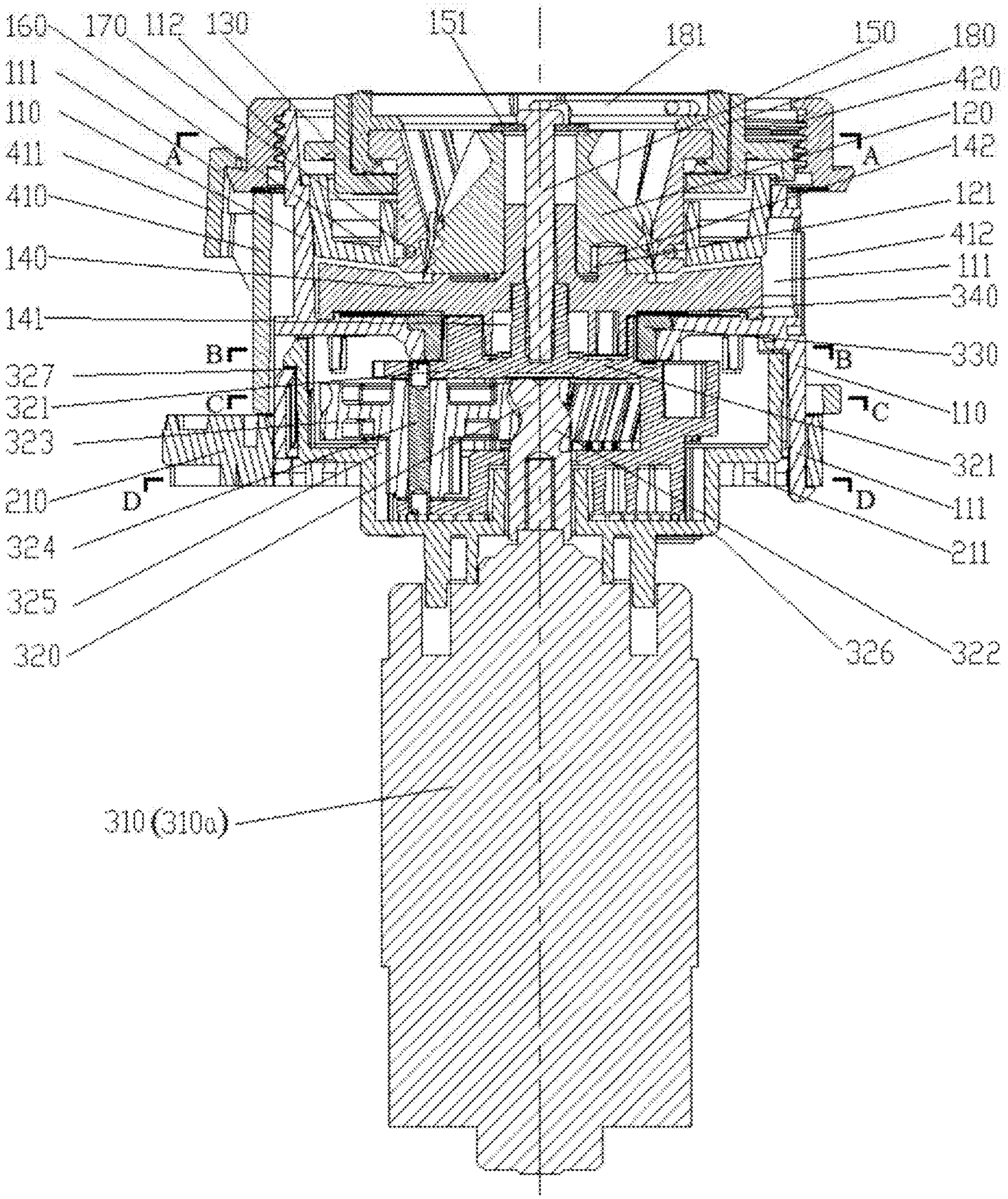
FIG. 2 shows a full sectional view of the grinding device in FIG. 1.
Figure 3:
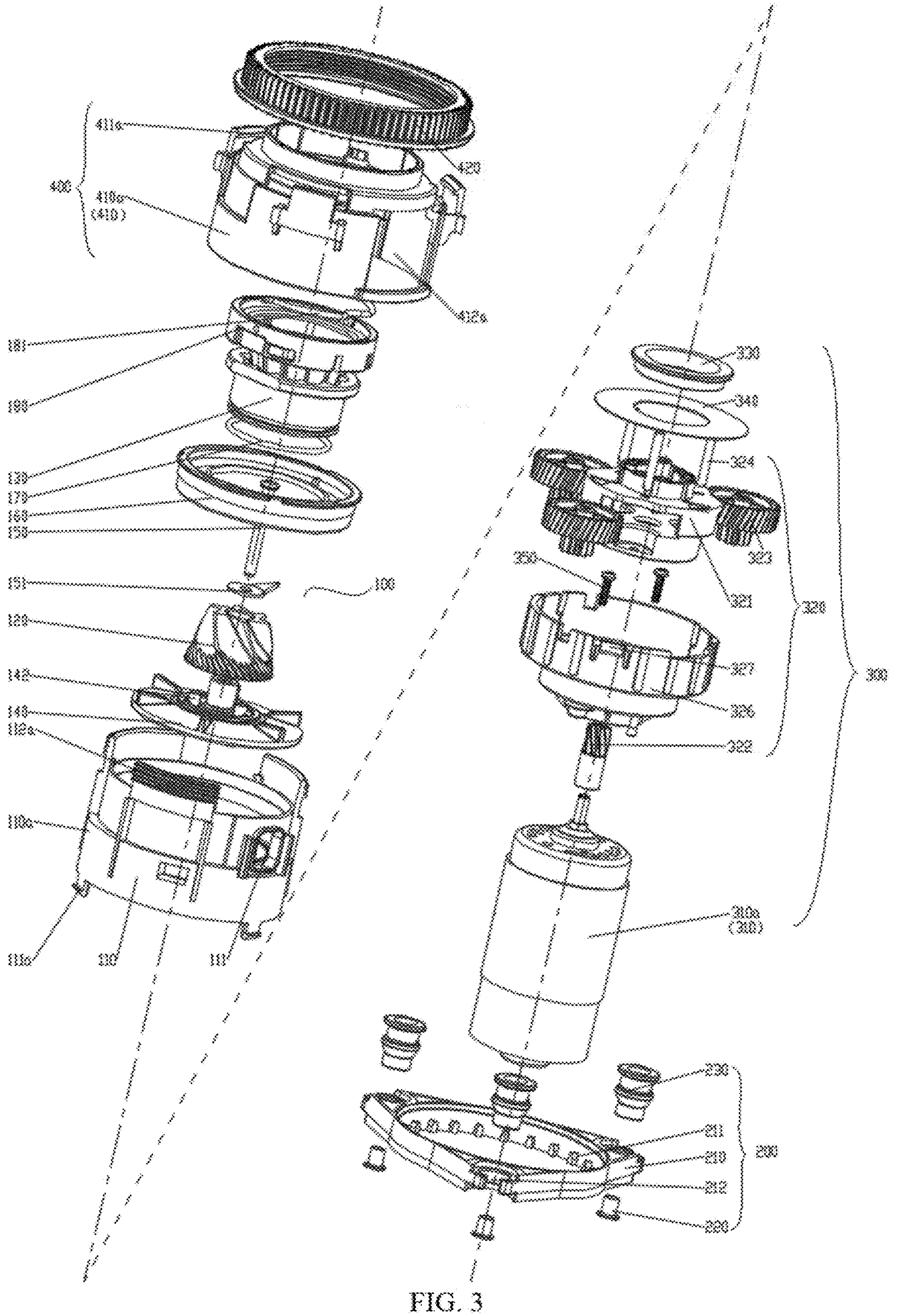
FIG. 3 shows an exploded view of the grinding device in FIG. 1.

FIG. 1 shows an overall structure of the grinding device. In some embodiments, the grinding device according to the embodiments of the present disclosure includes a grinding assembly 100, a power output assembly 300, and a manipulation assembly 400. As shown in FIG. 2 and FIG. 3, the grinding assembly 100 includes a first mounting member 110, a first grinding member 120, and a second grinding member 130. The first grinding member 120 cooperates with the second grinding member 130 to achieve grinding.

Other components in the grinding assembly 100 and the manipulation assembly 400 are mounted and fixed by the first mounting member 110. In some embodiments, the first mounting member 110 is connected to an external structure to achieve mounting and fixing of a whole grinding device. Referring to FIG. 1, in some embodiments, the grinding device further includes a support assembly 200 connected to the first mounting member 110, and the whole grinding device is mounted and fixed by the support assembly 200.

Referring to FIG. 1, in some embodiments, the manipulation assembly 400 is connected to and at least partially nested with the first mounting member 110. Since the first mounting member 110 serves as a mounting base for other components of the grinding assembly 100 and the manipulation assembly 400, an axial size of the grinding device can be reduced by at least partially axially nesting the first mounting member 110 with the manipulation assembly 400. However, in the related art, the first mounting member 110 and the manipulation assembly 400 are arranged in a non-axial nested manner, which may lead to an excessively long axial size of the grinding device, and further lead to an excessively large volume of the grinding device. Therefore, the first mounting member 110 and the manipulation assembly 400 in the embodiments of the present disclosure are at least partially axially nested, which can significantly reduce the axial size of the grinding device, thereby reducing the volume of the grinding device and solving the technical problem of large volume of the current grinding device to a certain extent.

The power output assembly 300 includes a power element 310 and a planetary gear mechanism 320. The planetary gear mechanism 320 is driven by the power element 310, and the planetary gear mechanism 320 is connected to the support assembly 200 and/or the first mounting member 110, i.e., the planetary gear mechanism 320 can be mounted and fixed by the support assembly 200 or the first mounting member 110. The planetary gear mechanism 320 may also be mounted and fixed simultaneously by the support assembly 200 and the first mounting member 110, which is not limited by the embodiments of the present disclosure. One of the first grinding member 120 and the second grinding member 130 is connected to a fixation frame 321 of the planetary gear mechanism 320 in a force-transfer manner, and another one of the first grinding member 120 and the second grinding member 130 is mounted at the manipulation assembly 400, enabling that the power output assembly 300 may drive the first grinding member 120 and the second grinding member 130 of the grinding assembly 100 to rotate relatively to grind bean ingredients.

The power element 310 of the power output assembly 300 may be a motor 310*a*, or a hydraulic motor, etc., which is not limited by the embodiments of the present disclosure. In some embodiments, the power element 310 of the power output assembly 300 is the motor 310*a*. Since the motor speed is high, the motor speed usually needs to be reduced and output to an actuator for use. The planetary gear mechanism 320 plays a role in reducing the motor speed, and a part of the planetary gear mechanism 320 may also play a role in increasing the torque.

Referring to FIG. 2, FIG. 3, FIG. 6, FIG. 8, and FIG. 9, in some embodiments, the planetary gear mechanism 320 includes a sun gear 322, a planet gear 323, a fixation frame 321, and an internal gear ring 325. The planet gear 323 is rotatably mounted at the fixation frame 321. The sun gear 322 of the planetary gear mechanism 320 is connected to an output shaft of the motor 310*a* in a force-transfer manner. Due to a need to ensure that the volume of the grinding device is not too large and at the same time to ensure a grinding effect, the planetary gear mechanism 320 is used as a speed reducer. The planetary gear mechanism 320 has a large reduction ratio, small occupied space, stable power output and other characteristics, and may also reduce noise of the grinding device. In some embodiments, the grinding device may also adopt other speed reducers, such as worm gear reduction mechanisms, reduction gear sets, etc., which are not limited by the embodiments of the present disclosure.

Figure 8:
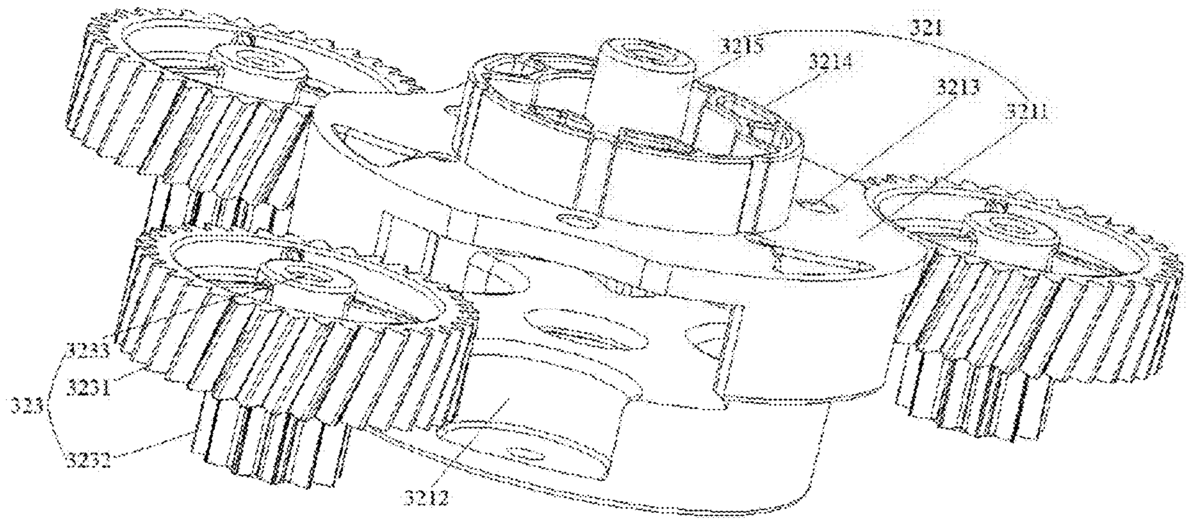
FIG. 8 shows an exploded view of a fixation frame and a planet gear in the grinding device of FIG. 1.
Figure 9:
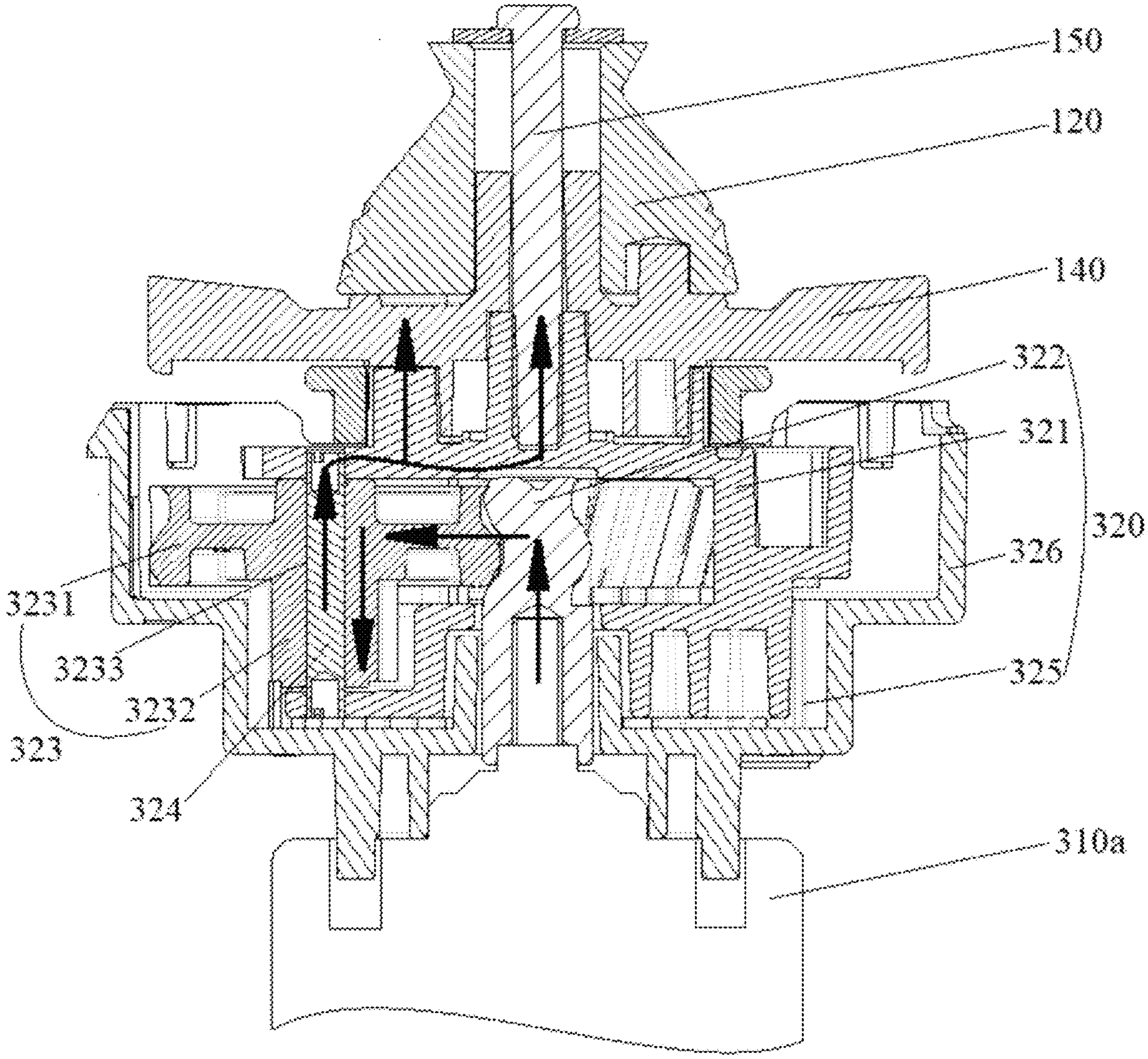
FIG. 9 shows a schematic view of a torque transmission path in a grinding device according to an embodiment of the present disclosure.

Referring to FIG. 8 and FIG. 9, in some embodiments, the fixation frame 321 of the planetary gear mechanism 320 is provided with an output member 3215 for outputting the torque. Power output from the power element 310 is input by the sun gear 322 of the planetary gear mechanism 320, and is output, after being decelerated from the sun gear 322 to the planet gear 323 to the internal gear ring 325 in the planetary gear mechanism 320, by the output member 3215 of the fixation frame 321 to the grinding assembly 100. By arranging the fixation frame 321, on the one hand, the fixation frame 321 is configured to mount the planet gear 323 to realize a function of the planetary frame, and on the other hand, the torque can be directly output to the grinding assembly 100, i.e., the planetary frame and the torque output member are integrated into the fixation frame 321. In the related art, the planetary gear mechanism is engaged with an external gear ring through the planet gear to output torque. The planet gear is mounted at the planetary frame, and the planetary frame and the external gear ring are two independent components. The fixation frame 321 is equivalent to an integration of the planetary frame and the external gear ring in the related art, saving one component. The planetary gear mechanism 320 has a simpler structure and a more compact internal space, enabling that the volume of the grinding device can be reduced.

The planet gear 323 is rotatably mounted at the fixation frame 321, and the fixation frame 321 rotates around the sun gear 322 along with a revolution of the planet gear 323. In some embodiments, referring to FIG. 8 and FIG. 9, the planet gear 323 is rotatably mounted at the fixation frame 321 by a planet gear shaft 324. In some embodiments, the planet gear 323 has a through-hole 3233 extending in the axial direction and penetrating the planet gear 323. The planet gear shaft 324 rotatably extends into the through-hole 3233, and has a clearance fit with the through-hole 3233. A bearing may also be provided between the planet gear shaft 324 and the through-hole 3233 to achieve a relative rotation of the planet gear 323 and the planet gear shaft 324.

In some embodiments, referring to FIG. 8, a specific structure of the fixation frame 321 is shown. The fixation frame 321 includes a main body 3211 and the output member 3215. The output member 3215 may be a structure protruding outwardly from the main body 3211, or a spline or a spline groove disposed on the main body 3211. The main body 3211 is provided with a plurality of gear mounting cavities 3212 and a plurality of pin holes 3213. The plurality of pin holes 3213 are in communication with the plurality of gear mounting cavities 3212. Each of two ends of the planet gear shaft 324 is mounted at a corresponding pin hole 3213. The planet gear 323 is rotatably arranged at the gear mounting cavity 3212 through the planet gear shaft 324, and is at least partially exposed outside the gear mounting cavity 3212 to be engaged with the internal gear ring 325. In some embodiments, the fixation frame 321 may have a plurality of weight reduction holes.

To improve transmission stability of the fixation frame 321, in some embodiments, the fixation frame 321 further includes a positioning member 3214 arranged on the main body 3211. The output member 3215 is located at an end of the main body 3211 in the axial direction, and the positioning member 3214 may be arranged at a same end or an opposite end as the output member 3215. In some embodiments, referring to FIG. 8, the positioning member 3214 is a collar disposed coaxially with the output member 3215 and on a same side as the output member 3215, and the collar surrounds the output member 3215 for cooperating with an inner ring of the bearing.

Referring to FIG. 8, a specific structure of the planet gear 323 in some embodiments is shown. The planet gear 323 includes a primary gear 3231 and a secondary gear 3232 that are sequentially arranged in the axial direction and have a common axis. The primary gear 3231 engages with the sun gear 322, and the secondary gear 3232 engages with the internal gear ring 325. To reduce volume, in some embodiments, the primary gear 3231 and the secondary gear 3232 have different diameters, e.g., the primary gear 3231 has a larger diameter than the secondary gear 3232. For certain operating conditions that require the planetary gear mechanism 320 to be subjected to certain axial forces, in some embodiments, one of the primary gear 3231 and the secondary gear 3232 may be a helical gear and the other may be a spur gear.

The primary gear 3231 and the secondary gear 3232 of the planet gear 323 may be integrally formed, i.e., the primary gear 3231 and the secondary gear 3232 are directly machined from blank. Each of the primary gear 3231 and the secondary gear 3232 has a concentric through-hole to form the through-hole 3233 of the planet gear 323. The planet gear shaft 324 may rotatably extend into the through-hole 3233. The two ends of the planet gear shaft 324 are fixedly connected to the fixation frame 321, as shown in FIG. 8 and FIG. 9. In some embodiments, the primary gear 3231 and the secondary gear 3232 may be independently formed and then mounted at a same central shaft to transfer torque through a key connection. The central shaft may be rotatably connected to the fixation frame 321, for example, the central shaft may rotatably extend into the pin hole 3213 of the fixation frame 321.

In some embodiments, referring to FIG. 8, the planet gear 323 is parallel to the output member 3215, and the primary gear 3231 is closer to the output member 3215 than the secondary gear 3232, forming a following power transmission path: the power element 310 to the sun gear 322 to the primary gear 3231 to the secondary gear 3232 to the fixation frame 321 to the output member 3215 to the first grinding member 120/the second grinding member 130. Since the primary gear 3231 is closer to the output member 3215 than the secondary gear 3232, the torque in a torque transmission process is not transmitted along a straight line, and there is a reciprocating transmission process in the axial direction of the planet gear. The torque transmission path is shown by an arrow in FIG. 9, which can improve the transmission stability of the planetary gear mechanism 320 and significantly reduce an eccentricity of the fixation frame 321 relative to the first grinding member 120/second grinding member 130.

Figure 5:
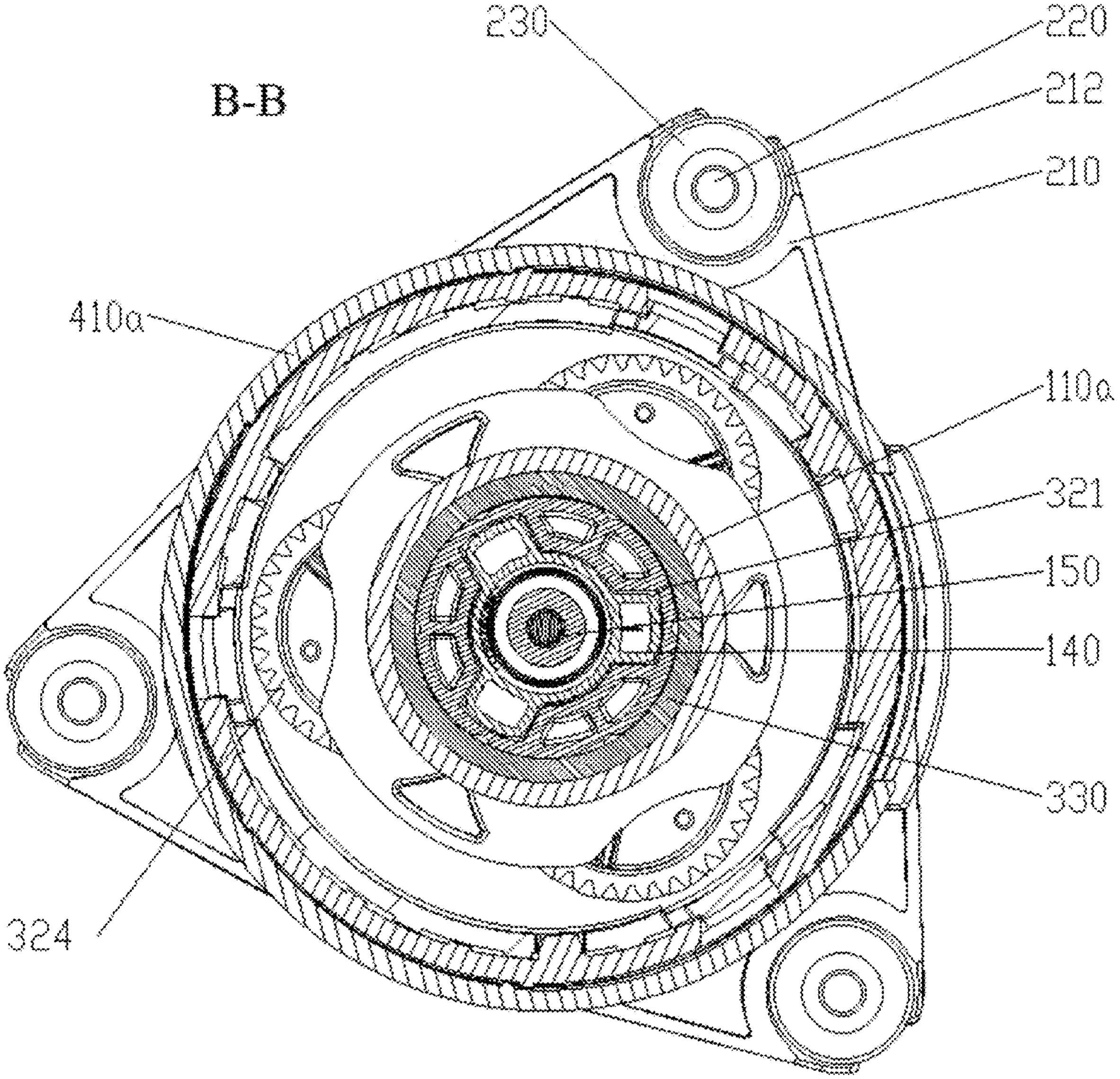
FIG. 5 shows a cross-sectional view of the grinding device of FIG. 1 at part B-B in FIG. 2.
Figure 6:
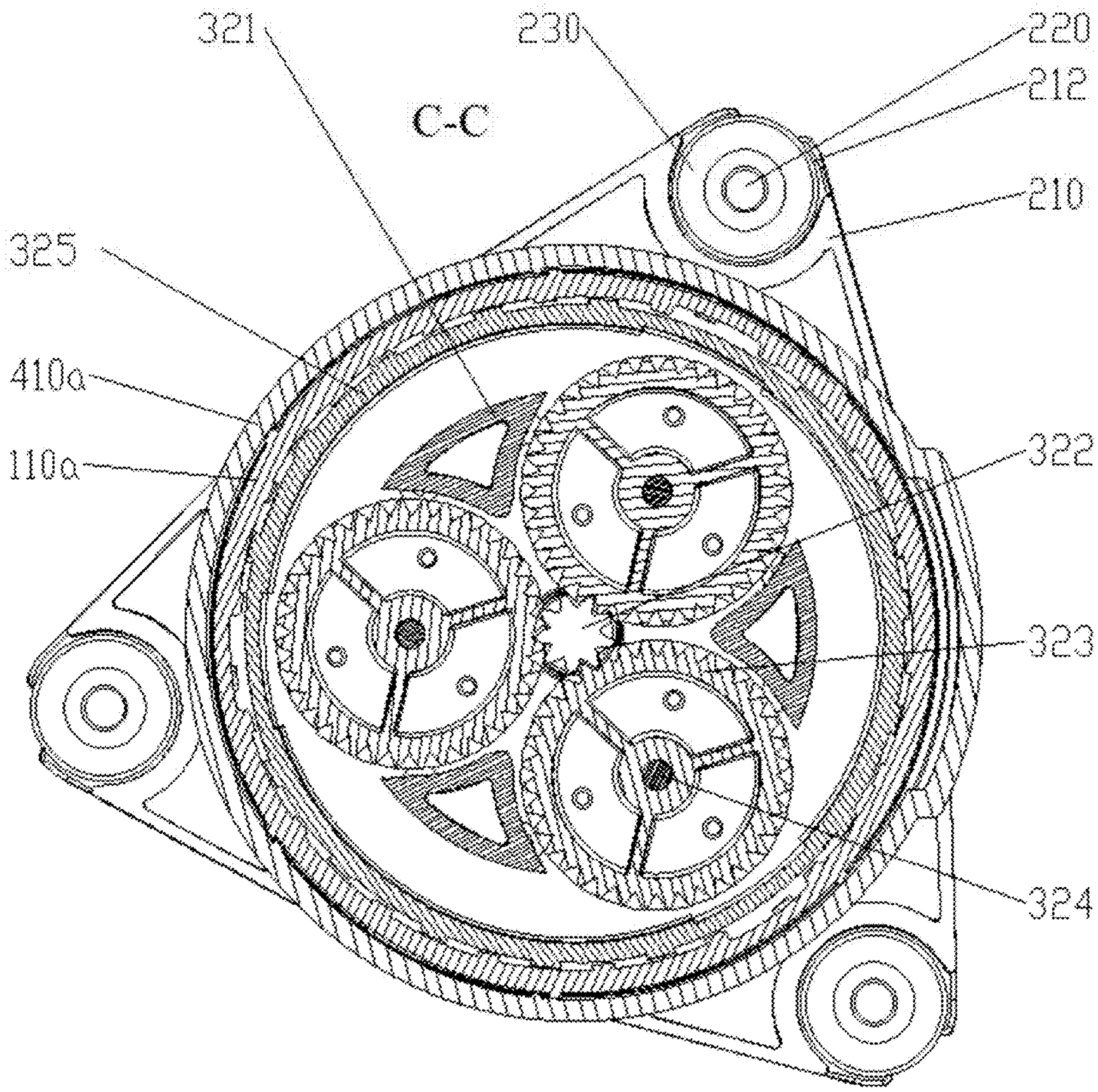
FIG. 6 shows a cross-sectional view of the grinding device of FIG. 1 at part C-C in FIG. 2.

In some embodiments, as shown in FIG. 3 and FIG. 5, the power output assembly 300 further includes a washer 340 arranged between a powder thrower 140 and a bearing 330 to ensure a rotation effect of the powder thrower 140 through the washer 340 and avoid interference between the powder thrower 140 and the bearing 330.

Figure 7:
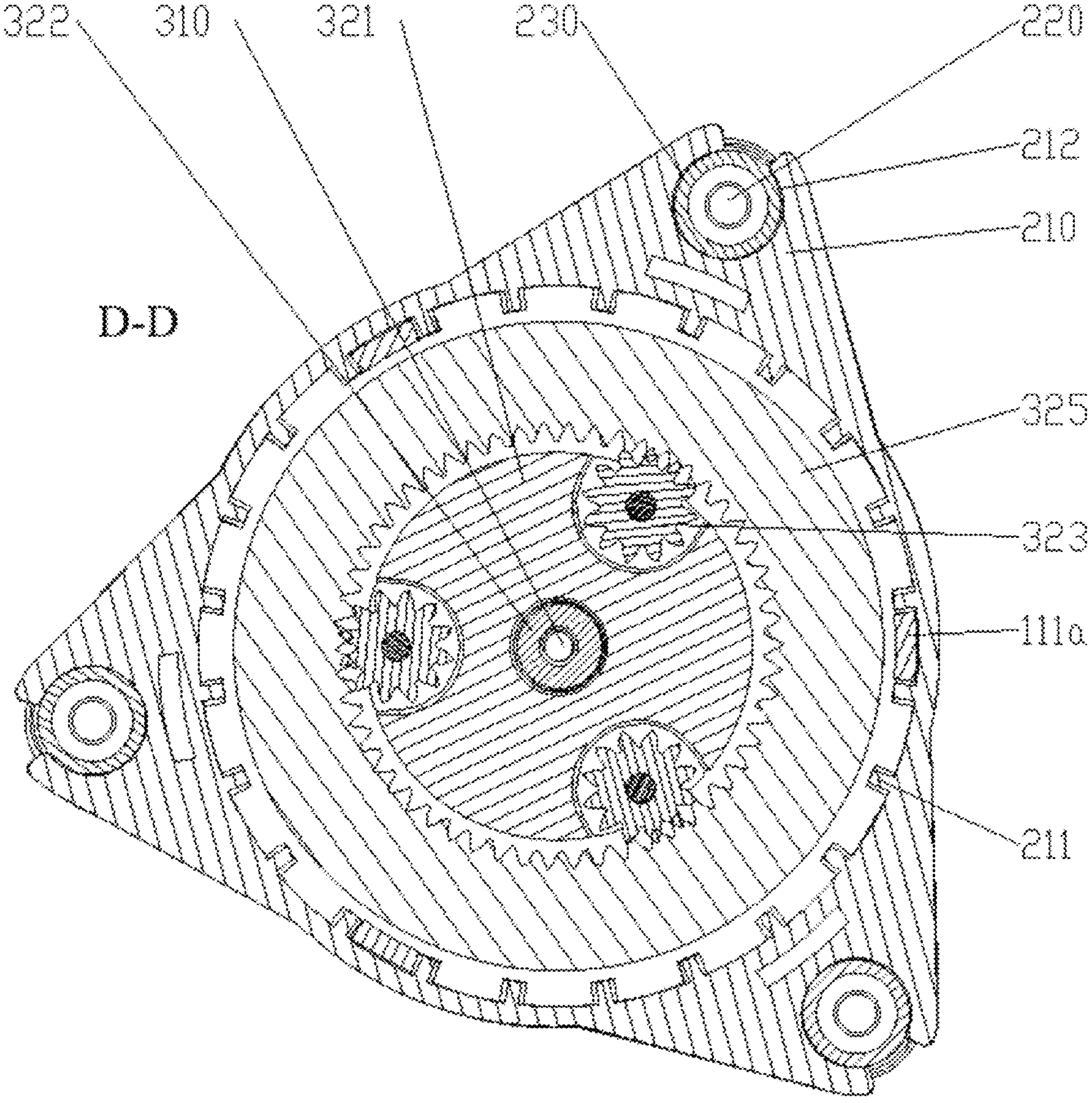
FIG. 7 shows a cross-sectional view of the grinding device of FIG. 1 at part D-D in FIG. 2.

To achieve a fixed arrangement of the power output assembly 300 on the grinding device, in some embodiments, as shown in FIG. 2, FIG. 3, and FIG. 7, the planetary gear mechanism 320 further includes a bottom housing 326 fixedly connected to a casing of the power element 310 and connected to the support assembly 200 and/or the first mounting member 110 to achieve a fixed arrangement of the power output assembly 300 through the housing. Considering that the internal gear ring 325 in the planetary gear mechanism 320 does not need to rotate, in some embodiments, the internal gear ring 325 and the bottom housing 326 of the planetary gear mechanism 320 are integrally formed. For example, an inner surface of the bottom housing 326 is directly processed to obtain the internal ring gear 325. The internal gear ring 325 and the bottom housing 326 of the planetary gear mechanism 320 may also be connected and formed by welding, or clamping, etc., which is not limited by the embodiments of the present disclosure.

To realize a fixed connection between the bottom housing 326 and the casing of the power element 310, in some embodiments, as shown in FIG. 3, the power output assembly 300 further includes a second screw rod 350. The bottom housing 326 has a through-hole, and the casing of the power element 310 has a threaded hole. The second screw rod 350 penetrates the through-hole of the bottom housing 326 and is connected to the threaded hole of the casing of the power element 310, to achieve the fixed connection between the bottom housing 326 and the casing of the power element 310 through the second screw rod 350.

In some embodiments, as shown in FIG. 2, the bottom housing 326 is connected to the first mounting member 110 to install and fix the bottom housing 326 to the first mounting member 110. Further, the bottom housing 326 is provided with a third snap member 327. The third snap member 327 of the bottom housing 326 is snapped with the first mounting member 110, to facilitate a disassembling and assembling between the bottom housing 326 and the first mounting member 110.

To enable that first grinding member 120 and the second grinding member 130 to adjust a grinding gap, in some embodiments, as shown in FIG. 3, the manipulation assembly 400 includes a second mounting member 410 and an adjustment member 420. The second mounting member 410 is connected to the adjustment member 420. One of the first grinding member 120 and the second grinding member 130 is connected to the fixation frame 321 of the planetary gear mechanism 320 in a force-transfer manner, and another one of the first grinding member 120 and the second grinding member 130 is mounted at the second mounting member 410 of the manipulation assembly 400. Referring to FIG. 2, in some embodiments, considering that the first mounting member 110 serves as the mounting base for other components in the grinding assembly 100, the first mounting member 110 is arranged closer to the first grinding member 120 and the second grinding member 130 than the second mounting member 410 for ease of mounting. The second mounting member 410 is movably arranged around the first mounting member 110, and a nested arrangement between the manipulation assembly 400 and the first mounting member 110 is realized by the second mounting member 410. In other embodiments, the first mounting member 110 may be movably arranged around the second mounting member 410, and the first mounting member 110 partially extends into an inner cavity of the second mounting member 410 to connect to other components of the grinding assembly 100.

Figure 4:
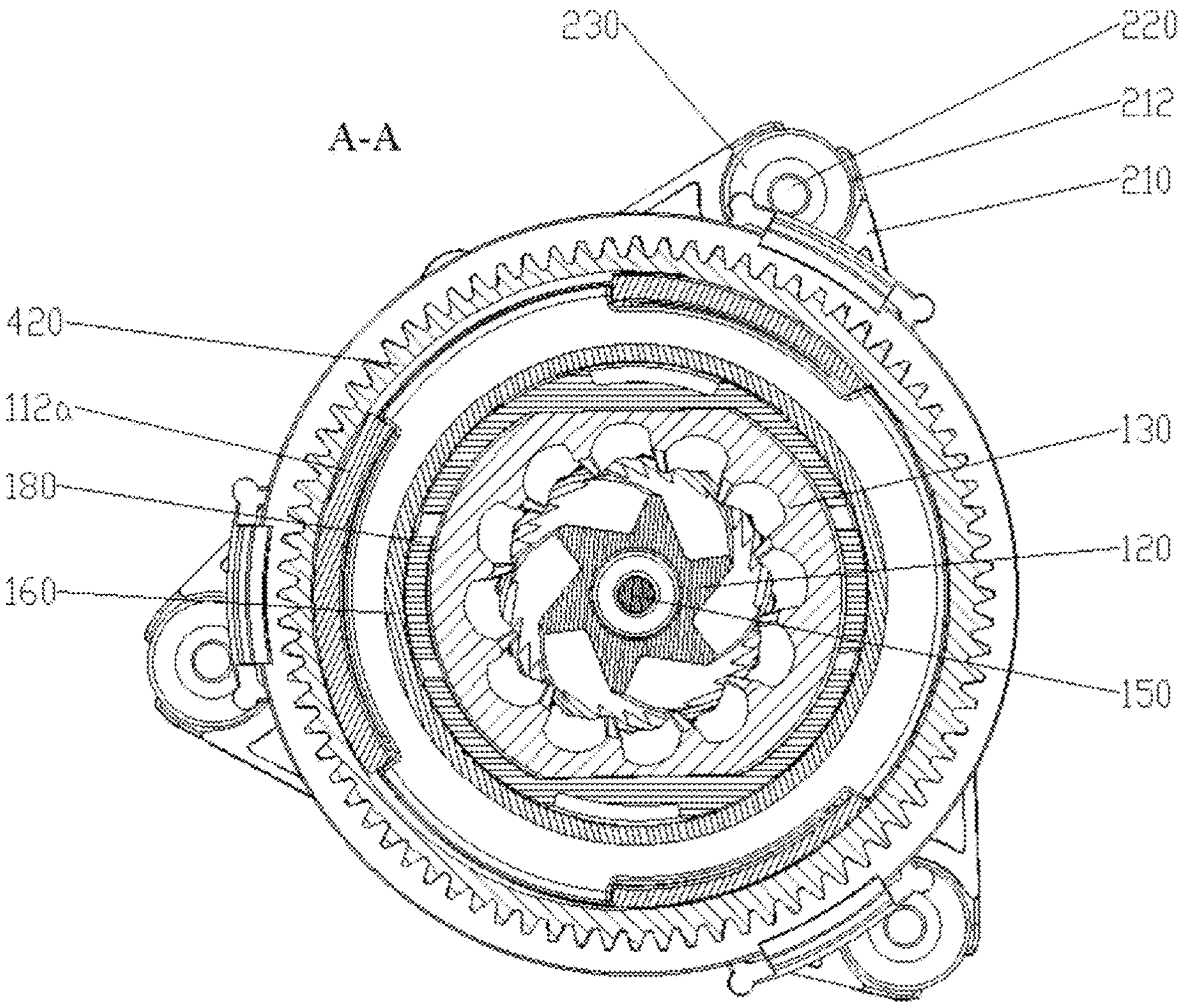
FIG. 4 shows a cross-sectional view of the grinding device of FIG. 1 at part A-A in FIG. 2.

Referring to FIG. 2 and FIG. 4, the first mounting member 110 is threadedly connected to the adjustment member 420. The first mounting member 110 is provided with external threads, and the adjustment member 420 is provided with internal threads. The internal threads of the adjustment member 420 are connected to the external threads of the first mounting member 110. In other embodiments, the first mounting member 110 may be arranged around the second mounting member 410. Correspondingly, the first mounting member 110 is provided with internal threads, and the adjustment member 420 is provided with external threads. The external threads of the adjustment member 420 are connected to the internal threads of the first mounting member 110, which is not limited in the embodiments of the present disclosure.

In some embodiments, on the one hand, by arranging the first mounting member 110 movably nested with the second mounting member 410 and connected to the second mounting member 420 by the adjustment member 420, since the first mounting member 110, the support assembly 200, and the planetary gear mechanism 320 are connected, no displacement occurs in the axial direction. Therefore, when the adjustment member 420 is rotated, the adjustment member 420 drives the second mounting member 410 to move in the axial direction together, enabling that the first grinding member 120 and the second grinding member 130 that are respectively connected to the planetary gear mechanism 320 and the second mounting member 410 generate an axial relative movement. An axial gap between the first grinding member 120 and the second grinding member 130 may be adjusted to change a particle volume of grinding powder. On the other hand, since the first mounting member 110 is connected to the second mounting member 410 through the adjustment member 420 in a threaded manner, only axial controlled displacement may occur between the first mounting member 110 and the second mounting member 410, and active axial movement and active radial displacement will not occur during operation, which can ensure a grinding gap required by the first grinding member 120 and the second grinding member 130 and can avoid a collision and heating of the first grinding member 120 and the second grinding member 130, solving problems of loud noise and grinding powder burning.

In some embodiment, as shown in FIG. 2, the first mounting member 110 is a hollow lower housing 110*a* to facilitate an arrangement of other components in the grinding assembly 100 and the planetary gear mechanism 320 in the first mounting member 110. Meanwhile, to facilitate an arrangement of the first mounting member 110 in the support assembly 200, the support assembly 200 is provided with a hollow structure.

Referring to FIG. 3 and FIG. 7, in some embodiments, to realize a stable connection between the lower housing 110*a* and the support assembly 200, the lower housing 110*a* is provided with a first snap member 111*a*, and is snapped with the support assembly 200 through the first snap member 111*a*. Therefore, by arranging that the lower housing 110*a* is snapped with the support assembly 200, a stable connection between the housing and the support assembly 200 is realized, which also facilitates the disassembling and assembling of the lower housing 110*a* on the support assembly 200.

Referring to FIG. 3 and FIG. 7, in some embodiments, to limit a rotation of the lower housing 110*a* on the support assembly 200, a plurality of rotation stop blocks 211 are arranged on an inner surface of the support assembly 200 at intervals. The first snap member 111*a* of the lower housing 110*a* is located between two adjacent rotation stop blocks 211 to prevent the rotation of the lower housing 110*a* around the axial direction by providing the rotation stop blocks 211. Meanwhile, since the first mounting member 110 is threadedly connected to the adjustment member 420, after the rotation of the lower housing 110*a* is limited by the plurality of rotation stop blocks 211, a reaction force may be provided for the lower housing 110*a* when the adjustment member 420 is rotated, which enables that the second mounting member 410 may move better in the axial direction on the first mounting member 110.

To better discharge grinding powder, in some embodiments, as shown in FIG. 2 and FIG. 3, the grinding assembly 100 further includes a powder thrower 140. The powder thrower 140 is connected to the fixation frame 321 in a force-transfer manner. The powder thrower 140 is arranged below the first grinding member 120 and the second grinding member 130. Each of the powder thrower 140, the first grinding member 120, and the second grinding member 130 is located in a cavity of the lower housing 110*a*. By arranging the powder thrower 140, powder ground by the first grinding member 120 and the second grinding member 130 falls onto the powder thrower 140, and a centrifugal force generated by a rotation of the powder thrower 140 is used to throw out the powder to the inner cavity wall of the lower housing 110*a*, facilitating that the powder is discharged. In addition, since each of the first grinding member 120 or the second grinding member 130 and the powder thrower 140 is connected to the fixation frame 321 in a transmitting force manner, the first grinding member 120 or the second grinding member 130, the powder thrower 140, and the fixation frame 321 may only rotate around the axial direction without moving in the axial direction, eliminating an axial relative displacement of the planetary gear mechanism 320 and the grinding assembly 100 and reducing noise during the operation.

As for a specific arrangement of the first grinding member 120 and the second grinding member 130, in some embodiments, as shown in FIG. 2, the first grinding member 120 is connected to the fixation frame 321 in a force-transfer manner. Correspondingly, the second grinding member 130 is connected to the second mounting member 410 of the manipulation assembly 400, to form a relative rotation arrangement relationship between the first grinding member 120 rotating and the second grinding member 130 being fixed. Referring to FIG. 2 and FIG. 5, in some embodiments, the fixation frame 321 is connected to the first mounting member 110 through the bearing 330 to achieve a rotational connection between the fixation frame 321 and the first mounting member 110. The powder thrower 140 has a positioning cavity 141. An upper end of the fixation frame 321 extends into the positioning cavity 141, and the first grinding member 120 has a limit cavity 121. The powder thrower 140 has a limit member 142 protruding outwardly, and the limit member 142 extends into the limit cavity 121. Therefore, by arranging the positioning cavity 141, the limit cavity 121, and the limit member 142, the upper end of the fixation frame 321 is inserted into the positioning cavity 141 of the powder thrower 140, and the limit member 142 of the powder thrower 140 is inserted into the limit cavity 121 of the first grinding member 120, thereby realizing a positioning assembling between the first grinding member 120, the powder thrower 140, and the fixation frame 321. The fixation frame 321 is enabled to rotate the powder thrower 140 and the first grinding member 120 simultaneously. In addition, by arranging the positioning cavity 141, the limit cavity 121, and the limit member 142, an axial and circumferential limiting effect is also performed on the first grinding member 120, the powder thrower 140, and the fixation frame 321.

To realize a stable connection between the first grinding member 120, the powder thrower 140, and the fixation frame 321, in some embodiments, as shown in FIG. 2 and FIG. 3, the grinding assembly 100 further includes a first screw rod 150. The powder thrower 140 has a through-hole, and the fixation frame 321 has a threaded hole. The first screw rod 150 penetrates the through-hole of the powder thrower 140 and is connected to the threaded hole of the fixation frame 321, to stably connect the first grinding member 120, the powder thrower 140, and the fixation frame 321 together through the first screw rod 150. In addition, to fix the first screw rod 150 better and prevent the first screw rod 150 from loosening, a gasket 151 is arranged around the first screw rod 150, and is disposed between a head of the first screw rod 150 and the first grinding member 120.

During an operation of the grinding device, the grinding device will generate heat due to internal grinding, and the lower housing 110*a* will undergo certain deformation under a condition of heating, affecting a threaded connection between the lower housing 110*a* and the adjustment member 420. In some embodiments, as shown in FIG. 3, the lower housing 110*a* is provided with a plurality of threaded protrusions 112*a* arranged at intervals in a circumferential direction. The plurality of threaded protrusions 112*a* are threadedly connected to the adjustment member 420. Therefore, by arranging threads of the lower housing 110*a* as thread segments arranged at intervals in the circumferential direction, a threaded connection between the lower housing 110*a* and the adjustment member 420 is not affected. Since the plurality of threaded protrusions 112*a* are arranged at intervals, the lower housing 110*a* may still be effectively connected to the adjustment member 420 under a condition that certain deformation occurs due to heating. In this case, a circumferential gap of the plurality of threaded protrusions 112*a* becomes smaller to ensure that the lower housing 110*a* is threadedly connected to the adjustment member 420. In the embodiments of the present disclosure, the lower housing 110*a* is provided with three threaded protrusions 112*a*. The lower housing 110*a* may also be provided with two, four, five, six and other number of threaded protrusions 112*a*, and the embodiments of the present disclosure is not limited thereto.

To enable the powder ground by the first grinding member 120 and the second grinding member 130 to fall better onto the powder thrower 140, in some embodiments, as shown in FIG. 2 and FIG. 3, the grinding assembly 100 further includes a powder blocking cover 160. The powder blocking cover 160 is snapped with the plurality of threaded protrusions 112*a*, and is disposed in the cavity of the lower housing 110*a* and above the powder thrower 140. Due to a relative rotation between the first grinding member 120 and the second grinding member 130, a part of the ground powder is thrown onto a cavity surface of the lower housing 110*a* and cannot fall onto the powder thrower 140. Even a part of the powder is thrown out of the lower housing 110*a* through a gap between the plurality of threaded protrusions 112*a* of the lower housing 110*a*. Therefore, by arranging the powder blocking cover 160, the powder obtained by grinding is limited to an interior of the powder blocking cover 160, and may fall on the powder thrower 140 as much as possible. Then, the powder is thrown outwardly in a uniform manner by a centrifugal force of the powder thrower 140.

In some embodiments, as shown in FIG. 2, the powder blocking cover 160 is arranged around the second grinding member 130. To ensure sealing between the powder blocking cover 160 and the second grinding member 130, the grinding assembly 100 further includes a sealing ring 170 arranged between the powder blocking cover 160 and the second grinding member 130, to avoid powder leakage from the powder blocking cover 160 and the second grinding member 130.

In some embodiments, as shown in FIG. 3, the second mounting member 410 is a hollow upper housing 410*a* when specific arranging the operating assembly, enabling that the upper housing 410*a* is movably arranged around the lower housing 110*a*. Further, the upper housing 410*a* is provided with a second snap member 411*a*, and the upper housing 410*a* is rotatably connected to the adjustment member 420 through the second snap member 411*a*, enabling that the upper housing 410*a* may be driven to move in the axial direction only by rotating the adjustment member 420. Furthermore, by nesting the upper housing 410*a* with the lower housing 110*a* in the axial direction, the upper housing 410*a* may only move in the axial direction on the lower housing 110*a* and cannot rotate around the axial direction, thereby ensuring connection stability between the upper housing 410*a* and the lower housing 110*a*. Thus, by arranging the upper housing 410*a* rotatably connected to the adjustment member 420, when the adjustment member 420 is rotated, the upper housing 410*a* only moves in the axial direction along with the adjustment member 420 without rotating.

To realize a connection between the second grinding member 130 and the upper housing 410*a*, in some embodiments, as shown in FIG. 3, the grinding assembly 100 further includes a fixation frame 180. The second grinding member 130 is snapped with the fixation frame 180, and the fixation frame 180 is snapped with the upper housing 410*a*, enabling that the second grinding member 130 is fixed to the upper housing 410*a* through the fixation frame 180 and that disassembling and assembling are convenient. In addition, the grinding assembly 100 further includes a handle 181 arranged on the fixation frame 180. Therefore, after using the grinding device, the second grinding member 130 is removed from the grinding device by the handle 181 to clean an interior of the grinding device.

To discharge the ground powder in the grinding device, in some embodiments, the upper housing 410*a* has a penetration hole 412*a*, and the first mounting member 110 is provided with a powder outlet 111. The penetration hole 412*a* of the upper housing 410*a* is provided corresponding to the powder outlet 111 of the first mounting member 110. The second mounting member 410 is movably arranged around the first mounting member 110, i.e., the upper housing 410*a* is movably arranged around the lower housing 110*a*. The powder ground by the first grinding member 120 and the second grinding member 130 falls onto the powder thrower 140, and is thrown out of the grinding device sequentially through the penetration hole 412*a* of the upper housing 410*a* and the powder outlet 111 of the first mounting member 110 by the centrifugal force of the powder thrower 140, thereby realizing the powder discharge of the grinding device.

In some embodiments, the whole grinding device is mounted at the grinding apparatus through the support assembly 200. Since a relative rotation occurs between the first grinding member 120 and the second grinding member 130, when the grinding device operates, to grind the bean ingredients located between the first grinding member 120 and the second grinding member 130, this process generates vibration and noise, which is a major factor affecting the user experience. Referring to FIG. 3 and FIG. 7, in some embodiments, the support assembly 200 includes a support frame 210, a sleeve 220, and an elastic member 230. Since the support frame 210 is hollow, the lower housing 110*a* and the planetary gear mechanism 320 are arranged in the support frame 210, which enables that the first snap member 111*a* of the lower housing 110*a* is snapped with the support frame 210, and the rotation stop block 211 is disposed on an inner circumferential surface of the support frame 210. The support frame 210 has a mounting hole 212 configured to mount the sleeve 220 and the elastic member 230. The elastic member 230 is arranged around the sleeve 220 and mounted at the mounting hole 212 of the support frame 210. By arranging the elastic member 230 between the support frame 210 and the sleeve 220, when the grinding device is mounted on the host of the grinding apparatus, a vibration transmission at a mounting position can be reduced, and the noise of the apparatus can be reduced.

Based on a same inventive concept, in one embodiment of the present disclosure, the grinding apparatus is provided. The grinding apparatus includes the grinding device in the embodiment of the above embodiment. The grinding device is a functional device arranged in the grinding apparatus. Since the first mounting member 110 in the grinding device is at least partially nested with the manipulation assembly 400 in the axial direction, the axial size of the grinding device can be significantly reduced, which enables that the volume of the grinding device is reduced, and the volume of the grinding apparatus is correspondingly reduced. The technical problem that the volume of the grinding apparatus is large due to the large volume of the current grinding device is solved to a certain extent.

In some embodiments, the grinding apparatus is a coffee grinder. Coffee beans fall between the first grinding member 120 and the second grinding member 130 through a bean bin, and are ground into coffee powder through a relative rotation between the first grinding member 120 and the second grinding member 130. The coffee powder are discharged to a powder outlet 111 of the first mounting member 110 through the powder thrower 140. The powder outlet 111 of the first mounting member 110 is provided with a powder outlet pipe configured to convey the coffee powder to a brewing assembly.

In some embodiments, the grinding apparatus is a pulverizing mill. Bean ingredients such as dried prickly ash and dried peanuts are placed between the first grinding member 120 and the second grinding member 130, and powdery ingredients such as prickly ash powder and peanut powder can be obtained from the powder outlet 111 of the first mounting member 110. In other embodiments, the grinding apparatus may also be a bean grinder, a soybean milk machine, etc., which is not limited by the embodiments of the present disclosure.

In the present disclosure, unless expressly specified and defined otherwise, the first feature "on" or "under" the second feature may include a direct contact between the first feature and the second feature, or an indirect contact between the first feature and the second feature, but by means of another feature between the first feature and the second feature. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

In descriptions of the present disclosure, it should be understood that the orientation or the position indicated by terms such as "center," "longitudinal," "lateral," "length," "width," "thickness," "above," "below," "front," "rear," "left," "right," "vertical," "horizontal," "top," "bottom," "inner," "outer," "clockwise," "anti-clockwise," "axial," "radial," and "circumferential" should be construed to refer to the orientation and the position as shown in the drawings in discussion, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

It should be noted that all orientation indications in embodiments of the present disclosure are configured to explain only a relative positional relationship, movement, etc., between the components in a particular attitude. If the particular attitude is changed, the orientation indications are changed accordingly.

In the present disclosure, unless otherwise clearly specified and limited, terms such as "connect," "fix" and the like should be understood in a broad sense. For example, "connect" may be a fixed connection or a detachable connection or connection as one piece; mechanical connection or electrical connection; direct connection or indirect connection through an intermediate; internal communication of two components or the interaction relationship between two components, unless otherwise clearly specified and limited. For those skilled in the art, the specific meaning of the above-mentioned terms in the embodiments of the present disclosure can be understood according to specific circumstances.

In addition, descriptions such as "first" and "second" in the present disclosure are only used for descriptive purposes, and cannot be understood as indicating or implying relative importance or implicitly indicating the number of indicated technical features. Therefore, the features associated with "first" and "second" may explicitly or implicitly include one or more of the features. In the description of the present disclosure, "plurality" means at least two, unless otherwise specifically defined.

In the description of the present disclosure, description of terms such as "an embodiment," "some embodiments," "an example," "a specific example" and "some examples" means that specific features, structures, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials, or characteristics may be combined in any one or more embodiments or examples in a suitable manner. In addition, those skilled in the art may join and combine different embodiments or examples described in the specification.

In addition, the technical solutions between the various embodiments may be combined with each other, but must be based on the fact that those skilled in the art are able to achieve it. When the combination of technical solutions appears to be contradictory or unattainable, it should be considered that the combination of such technical solutions does not exist, and is not included in the protection scope of the present disclosure.

Although embodiments of the present disclosure have been illustrated and described, it is conceivable for those skilled in the art that various changes, modifications, replacements, and variations may be made to these embodiments without departing from the principles and spirit of the present disclosure. The scope of the invention shall be defined by the claims as appended and their equivalents.

What is claimed is:

1. A grinding device comprising:

a grinding assembly including a mounting member, a first grinding member, and a second grinding member cooperating with the first grinding member to implement grinding;

a power output assembly including a power element and a planetary gear mechanism, the planetary gear mechanism including a sun gear, a planet gear, an internal gear ring, and a fixation frame, the sun gear being connected to the power element in a force-transfer manner, the planet gear being rotatably mounted at the fixation frame, and the fixation frame including an output member configured to output power;

a manipulation assembly connected to the mounting member;

wherein one of the first grinding member and the second grinding member is connected to the output member in a force-transfer manner, and another one of the first grinding member and the second grinding member is mounted at the manipulation assembly; wherein the planet gear includes a primary gear and a secondary gear that are arranged sequentially in an axial direction, the primary gear being engaged with the sun gear, the secondary gear being engaged with the internal gear ring, and the primary gear being closer to the output member than the secondary gear.

2. The grinding device according to claim 1, wherein:

the mounting member includes a hollow lower housing; and the fixation frame is located in a cavity of the lower housing, and is rotatably connected to the mounting member through a bearing.

3. The grinding device according to claim 1, wherein:

the mounting member includes a hollow lower housing; and the grinding assembly further includes a powder thrower connected to the output member in a force-transfer manner, the powder thrower being arranged below the first grinding member and the second grinding member, and the powder thrower, the first grinding member, and the second grinding member being located in a cavity of the lower housing.

4. The grinding device according to claim 3, wherein the grinding assembly further includes a powder blocking cover connected to the lower housing in a snapping manner, the powder blocking cover being arranged in the cavity of the lower housing and located above the powder thrower.

5. The grinding device according to claim 3, wherein:

the powder thrower has a positioning cavity; and the output member protrudes outwardly and extends into the positioning cavity.

6. The grinding device according to claim 3, wherein:

the first grinding member has a limit cavity; and the powder thrower is provided with a limit member protruding outwardly and extending into the limit cavity.

7. The grinding device according to claim 1, wherein the first grinding member is connected to the output member in a force-transfer manner.

8. The grinding device according to claim 1, wherein:

the mounting member is a first mounting member;

the manipulation assembly includes a second mounting member and an adjustment member rotatably connected to each other;

the second mounting member is at least partially movably nested with the first mounting member; and the first mounting member is threadedly connected to the adjustment member.

9. The grinding device according to claim 1, wherein:

the planetary gear mechanism further includes a planet gear shaft;

the planet gear has a through-hole extending in the axial direction; and the planet gear shaft rotatably extends into the through-hole and is fixedly connected to the fixation frame.

10. The grinding device according to claim 1, wherein:

the planetary gear mechanism further includes a bottom housing fixedly connected to a casing of the power element and connected to the mounting member; and the internal gear ring and the bottom housing are integrally formed.

11. The grinding device according to claim 1, further comprising:

a support assembly removably connected to the mounting member.

12. A grinding apparatus comprising:

a grinding device including:

a grinding assembly including a mounting member, a first grinding member, and a second grinding member cooperating with the first grinding member to implement grinding;

a power output assembly including a power element and a planetary gear mechanism, the planetary gear mechanism including a sun gear, a planet gear, an internal gear ring, and a fixation frame, the sun gear being connected to the power element in a force-transfer manner, the planet gear being rotatably mounted at the fixation frame, and the fixation frame including an output member configured to output power;

a manipulation assembly connected to the mounting member;

wherein one of the first grinding member and the second grinding member is connected to the output member in a force-transfer manner, and another one of the first grinding member and the second grinding member is mounted at the manipulation assembly;

wherein the planet gear includes a primary gear and a secondary gear that are arranged sequentially in an axial direction, the primary gear being engaged with the sun gear, the secondary gear being engaged with the internal gear ring, and the primary gear being closer to the output member than the secondary gear.

13. The grinding apparatus according to claim 12, wherein:

the mounting member includes a hollow lower housing; and the fixation frame is located in a cavity of the lower housing, and is rotatably connected to the mounting member through a bearing.

14. The grinding apparatus according to claim 12, wherein:

the mounting member includes a hollow lower housing; and the grinding assembly further includes a powder thrower connected to the output member in a force-transfer manner, the powder thrower being arranged below the first grinding member and the second grinding member, and the powder thrower, the first grinding member, and the second grinding member being located in a cavity of the lower housing.

15. The grinding apparatus according to claim 14, wherein the grinding assembly further includes a powder blocking cover connected to the lower housing in a snapping manner, the powder blocking cover being arranged in the cavity of the lower housing and located above the powder thrower.

16. The grinding apparatus according to claim 14, wherein:

the powder thrower has a positioning cavity; and the output member protrudes outwardly and extends into the positioning cavity.

17. The grinding apparatus according to claim 14, wherein:

the first grinding member has a limit cavity; and the powder thrower is provided with a limit member protruding outwardly and extending into the limit cavity.

18. The grinding apparatus according to claim 12, wherein the first grinding member is connected to the output member in a force-transfer manner.

19. The grinding apparatus according to claim 12, wherein the grinding apparatus includes a coffee grinder, a bean grinder, or a pulverizing mill.

* * * * *